(12) United States Patent
Zhang et al.

(10) Patent No.: US 11,454,558 B2
(45) Date of Patent: Sep. 27, 2022

(54) FABRY-PEROT SENSOR AND METHOD FOR MANUFACTURING SAME

(71) Applicant: BEIJING BYWAVE SENSING TECHNOLOGY CO., LTD., Beijing (CN)

(72) Inventors: Lizhe Zhang, Beijing (CN); Chun Lin, Beijing (CN)

(73) Assignee: BEIJING BYWAVE SENSING SCIENCE & TECHNOLOGY DEVELOPMENT CO., LTD., Beijing (CN)

(*) Notice: Subject to any disclaimer, the term of this patent is extended or adjusted under 35 U.S.C. 154(b) by 237 days.

(21) Appl. No.: 16/770,381

(22) PCT Filed: Dec. 4, 2018

(86) PCT No.: PCT/CN2018/119136
§ 371 (c)(1),
(2) Date: Jun. 5, 2020

(87) PCT Pub. No.: WO2019/109905
PCT Pub. Date: Jun. 13, 2019

(65) Prior Publication Data
US 2020/0386635 A1   Dec. 10, 2020

(30) Foreign Application Priority Data

Dec. 5, 2017 (CN) .......................... 201711269044.4

(51) Int. Cl.
*G01L 1/24* (2006.01)
(52) U.S. Cl.
CPC ...................... *G01L 1/24* (2013.01)
(58) Field of Classification Search
CPC ....................................................... G01L 1/24
(Continued)

(56) References Cited

U.S. PATENT DOCUMENTS

2006/0115202 A1* 6/2006 Stevens ................. G01L 9/0079
385/12
2006/0133715 A1* 6/2006 Belleville ............... G01L 19/04
385/13
(Continued)

FOREIGN PATENT DOCUMENTS

| CN | 124524 A | 1/2000 |
| CN | 1242524 A | 1/2000 |

(Continued)

OTHER PUBLICATIONS

Decision to Grant a Patent dated Oct. 25, 2021 received in Japanese Patent Application No. JP 2020-549854 together with an English language translation.

(Continued)

*Primary Examiner* — Nathaniel T Woodward
(74) *Attorney, Agent, or Firm* — Scully Scott Murphy & Presser

(57) ABSTRACT

Disclosed are a Fabry-Perot sensor and a method for manufacturing the same. A Fabry-Perot sensor including: a base part; a cavity formed between the base part and a pressure-sensitive film, and enclosed by the base part and the pressure-sensitive film; the pressure-sensitive film, fixed to the base part, wherein the pressure-sensitive film has one or more localised areas, each localised area has a doping substance doped into a base material of the pressure-sensitive film to produce stress, no localised area penetrates the entire thickness of the pressure-sensitive film, and under the effect of stress, the pressure-sensitive film has a corrugated structure; an optic fibre used for conducting a light signal, one end part of the optic fibre being fixed to an optic fibre mounting part of the base part, and the optic fibre mounting part being located at an end part of the base part opposite the cavity.

20 Claims, 14 Drawing Sheets

(58) Field of Classification Search
USPC .................................................. 73/862.624
See application file for complete search history.

(56) References Cited

U.S. PATENT DOCUMENTS

| | | |
|---|---|---|
| 2012/0227505 A1 | 9/2012 | Belleville et al. |
| 2014/0208858 A1 | 7/2014 | Jiang et al. |

FOREIGN PATENT DOCUMENTS

| | | |
|---|---|---|
| CN | 102384809 A | 3/2012 |
| CN | 103234673 A | 8/2013 |
| CN | 103534568 A | 1/2014 |
| CN | 104596685 A | 5/2015 |
| CN | 105568219 A | 5/2016 |
| CN | 105606277 A | 5/2016 |
| CN | 106017754 A | 10/2016 |
| CN | 207662545 U | 7/2018 |
| JP | 06-085287 A | 3/1994 |
| JP | H06-085287 A | 3/1994 |
| JP | H08-078645 A | 3/1996 |
| JP | 10-056186 A | 2/1998 |
| JP | H10-056186 A | 2/1998 |
| JP | 2008-524606 A | 7/2008 |
| JP | 2014-507666 A | 3/2014 |
| JP | 2015-184036 A | 10/2015 |
| WO | 02/23148 A1 | 3/2002 |

OTHER PUBLICATIONS

International Search Report dated Mar. 1, 2019 received in International Patent Application No. PCT/CN2018/119136 together with an English language translation.

* cited by examiner

FABRY-PEROT SENSOR AND METHOD FOR MANUFACTURING SAME

CROSS-REFERENCE TO RELATED APPLICATIONS

This application claims priority to PCT International Application No. PCT/CN2018/119136, filed on Dec. 4, 2018, which claims priority to Chinese Patent Application No. 201711269044.4, filed on Dec. 5, 2017, the contents of each of which are incorporated herein by reference.

TECHNICAL FIELD

The present disclosure relates to the field of sensors, in particular to a Fabry-Perot sensor with a non-linear compensation design and an optimized structure, and to a method of manufacturing the same.

BACKGROUND

Fiber optic sensors have been widely used in various industries, such as petroleum, aviation, aerospace, medical treatment, marine, or the like, and have demonstrated excellent performance, such as advantages of resistance to harsh environments, resistance to electromagnetic radiation, anti-interference, passive explosion-proof, small size, simple structure, large dynamic range, quasi-distribution measurement, and a small amount of material used during manufacturing.

There are mainly two technologies relatively mature of fiber optic sensors. A first one is the use of fiber gratings attached to a model to be pressed so as to perform pressure measurement through deformation of the model under pressure; and a second one is a Fabry-Perot cavity (or referred to as FP cavity for short) technology that senses the pressure or temperature through a change in a cavity length. A fiber optic sensor using the second technology may be referred to as a fiber optic Fabry-Perot sensor, or may be referred to as a Fabry-Perot sensor, an FP sensor, and the like for short, which is particularly suitable for use as a pressure sensor.

U.S. Pat. No. 7,689,071B2 discloses a Fabry-Perot sensor for measuring pressure. FIG. 1 shows an exemplary diagram of such an existing Fabry-Perot sensor. The Fabry-Perot sensor mainly includes a glass base 1_6 having a cavity 1_5, a single-layer pressure sensitive diaphragm 1_4 fixed to the glass base 1_6, a first reflective mirror 1_3 provided at the bottom of the cavity of the glass base 1_6, a second reflective mirror 1_2 provided on a lower surface of the pressure sensitive diaphragm 1_4, and a bi-directional fiber optic 1_1 for conducting a light signal. The first reflective mirror 1_3, the second reflective mirror 1_2 and the cavity 1_5 constitute a Fabry-Perot cavity. Since the length of the Fabry-Perot cavity is an unambiguous function of pressure, pressure applied to the pressure sensitive diaphragm 1-4 can be obtained by obtaining the length of the Fabry-Perot cavity.

There are several problems in adopting the above-mentioned Fabry-Perot sensor in a single-crystal thin-film structure. As shown in FIG. 3, as pressure increases, increase in the offset of the pressure sensitive diaphragm decreases significantly, that is, the offset of the pressure sensitive diaphragm is a nonlinear function of the applied pressure. Due to the strong nonlinearity in the offset of the pressure sensitive diaphragm in the full pressure range, sensitivity of the Fabry-Perot sensor is limited in the higher pressure range.

In response to the technical problem described above, patent CN103534568B discloses a Fabry-Perot sensor for measuring pressure where sensitivity around specific bias pressure. FIG. 2 shows a partial schematic diagram of the Fabry-Perot sensor disclosed in the patent CN103534568B. Specifically, the Fabry-Perot sensor comprises a base 2_1 and a pressure sensitive diaphragm mounted on the substrate. The pressure sensitive diaphragm comprises a first layer 2_2 made of a first material, and a second layer 2_3 made of a second material and comprising internal stresses. The second layer 2_3 is mounted on the first layer 2_2, so that the pressure sensitive diaphragm forms a double-layer structure.

The above Fabry-Perot sensor with a double-layer or more-layer composite diaphragm structure still has several problems, including but not limited to the following, first, the use of an additional and stressed structural layer to stretch a segment with linear sensitivity of the sensor necessitate a non-single layer structure of the pressure sensitive diaphragm, increasing the complexity in structure of the pressure sensitive diaphragm; second, compared with a single-layer diaphragm, a multi-layer diaphragm will reduce the sensitivity of the overall sensor due to the increase in diaphragm thickness; third, the long-term stability of the material of the multi-layer diaphragm itself also comprehensively affects the long-term performance of the sensor; and fourth, due to the micro size, in the manufacturing method of the above patents, complicated processes and steps are required in order to add the second layer to the first layer, which increases manufacturing costs of a sensor.

SUMMARY

Focusing on the above-mentioned problems in the existing sensor designs, the present disclosure designs a new type of Fabry-Perot sensor, which not only avoids the above-mentioned problems in the existing sensor designs, but also has other advantages described below.

The present disclosure provides a Fabry-Perot sensor including: a base; a cavity formed between the base and a pressure sensitive diaphragm, and closed by the base and the pressure sensitive diaphragm; the pressure sensitive diaphragm fixed to the base, where the pressure sensitive diaphragm has at least one local areas, each of the local areas has a doping substance doped into a base material of the pressure sensitive diaphragm to generate stresses, any of the local areas does not extend the entire thickness of the pressure sensitive diaphragm, and the pressure sensitive diaphragm exhibits a wavy structure under the action of the stresses; and a fiber optic configured to conduct a light signal, where one end of the fiber optic is fixed to a fiber optic mounting portion of the base, and the fiber optic mounting portion is located at an end of the base opposite the cavity. By means of substance doping, nonlinearity of a sensor can be reduced in an effective manner, and applicability of the sensor in different ranges can be improved.

Optionally, the pressure sensitive diaphragm is an integrated single-layer structure. Achieving a wavy structure of a diaphragm in a specific doping manner not only avoids the aforementioned many problems in the existing double-layer diaphragm structure, but also avoids the complicated technical steps of constructing a multilayer diaphragm structure.

Optionally, the pressure sensitive diaphragm has a thickness of 1 μm to 5 μm. Optionally, the base has a thickness of 200 μm to 500 μm. Optionally, the cavity has a diameter of 80 μm to 300 μm. That is, the technical solution defined by the present disclosure is particularly suitable for implementation in miniature sensors.

Optionally, the stresses are tensile stresses. Optionally, the stresses are compressive stresses.

Optionally, the at least one local areas include a substantially circular area located at the center of the pressure sensitive diaphragm. Optionally, the at least one local areas include a substantially annular area surrounding the center of the pressure sensitive diaphragm.

Optionally, the local area is located in a local thickness of the pressure sensitive diaphragm close to the cavity. Optionally, the local area is located in a local thickness of the pressure sensitive diaphragm away from the cavity.

Optionally, different local areas are doped with different doping substances. Optionally, the same local area is doped with different doping substances.

Stress concentration is formed in a diaphragm by doping, and stress type and a concentrated area are set reasonably, so that an optimized and reasonable wavy structure can be formed, thereby improving sensor performance.

Optionally, the base material of the pressure sensitive diaphragm is silicon.

Optionally, the doping substance is at least one of P, B, As, Al, Ga, Sb, Ge, O, Au, Fe, Cu, Ni, Zn, and Mg.

Optionally, the fiber optic is fixed to a fiber optic receiving portion by UV glue.

Optionally, the Fabry-Perot sensor further includes a first reflective film and a second reflective film, the first reflective film is located on one side of the pressure sensitive diaphragm, and the second reflective film is located at the bottom of the cavity.

Optionally, materials forming the first reflective film and the second reflective film are at least one of Cr, Ti, Au, Ag, TaN, $Al_2O_3$, and $Ta_2O_5$.

Optionally, a material forming the base is at least one of glass, single crystal silicon, silicon carbide, and sapphire.

Optionally, the cavity is a vacuum cavity.

The present disclosure further proposes a method of manufacturing a Fabry-Perot sensor including:
  manufacturing a pressure sensitive diaphragm, including:
    step 1: providing a pressure sensitive diaphragm substrate for producing the pressure sensitive diaphragm; and
    step 2: doping at least one doping substances into at least one local areas of the pressure sensitive diaphragm substrate to generate stresses in the local areas, where any of the local areas does not extend the entire thickness of the pressure sensitive diaphragm;
  manufacturing a base with a cavity; and
  bonding the pressure sensitive diaphragm and the base together such that the cavity is closed by the pressure sensitive diaphragm and the base.

Optionally, the pressure sensitive diaphragm after substance doping is an integrated single-layer structure.

Optionally, the pressure sensitive diaphragm has a thickness of 1 µm to 5 µm, and the base has a thickness of 200 µm to 500 µm.

Optionally, the stresses are tensile stresses. Optionally, the stresses are compressive stresses.

Optionally, in step 2, the doping substance and a base material constituting the pressure sensitive diaphragm substrate are doped at the atomic or molecular level.

Optionally, the local areas are at least one substantially annular areas. Optionally, the local areas are at least one substantially circular areas.

Optionally, the pressure sensitive diaphragm substrate is an SOI wafer.

Optionally, the pressure sensitive diaphragm substrate is a silicon substrate on which a silicon dioxide layer is formed.

Optionally, the step 1 further includes: cleaning and drying the pressure sensitive diaphragm substrate.

Optionally, the step 2 further includes: applying a photoresist to the pressure sensitive diaphragm substrate, and removing part of the photoresist to expose the local area to be doped.

Optionally, in step 2, doping is performed by high temperature diffusion.

Optionally, the high temperature diffusion is specifically concentrated boron diffusion at high temperature.

Optionally, in step 2, doping is performed by ion implantation.

Optionally, at least one of B, P, and As are selected as implanted ions during the ion implantation.

Optionally, the step of manufacturing the pressure sensitive diaphragm further includes: step 3: cleaning the pressure sensitive diaphragm after doping to remove impurities on the surface of the pressure sensitive diaphragm; and step 4: annealing the cleaned pressure sensitive diaphragm.

Optionally, the step of manufacturing the pressure sensitive diaphragm further includes step 5: forming a first reflective film on one side of the pressure sensitive diaphragm by one of evaporation, sputtering, chemical vapor deposition, electrochemistry, and epitaxial growth.

Optionally, the pressure sensitive diaphragm is bonded to the base in a vacuum environment.

Optionally, the step of manufacturing the base includes: growing a mask on the base; applying a photoresist on the mask; removing part of the photoresist to expose part of the mask; removing the exposed mask to expose part of the base; and etching the exposed base to form the cavity.

Optionally, the step of manufacturing the base further includes: forming a second reflective film at the bottom of the cavity.

Optionally, the step of manufacturing the base further includes: forming a fiber optic receiving portion at the bottom of the cavity.

Optionally, the method further includes: mounting a fiber optic to the fiber optic receiving portion of the base using UV glue.

Optionally, the method further includes: after bonding the pressure sensitive diaphragm to the base, removing a thick silicon layer and a silicon dioxide layer of the SOI.

Optionally, the method further includes: cutting the pressure sensitive diaphragm and the base bonded together to form multiple Fabry-Perot sensors.

Hereinafter, preferred embodiments for implementing the present disclosure will be described in more detail with reference to accompanying drawings, so that features and advantages of the present disclosure can be easily understood.

BRIEF DESCRIPTION OF THE DRAWINGS

In order to more clearly explain the technical solutions of embodiments of the present disclosure, drawings of the embodiments of the present disclosure will be briefly described below. The drawings are only used to show some embodiments of the present disclosure, rather than limiting all embodiments of the present disclosure thereto.

DETAILED DESCRIPTION OF THE PREFERRED EMBODIMENTS

Figure 1:
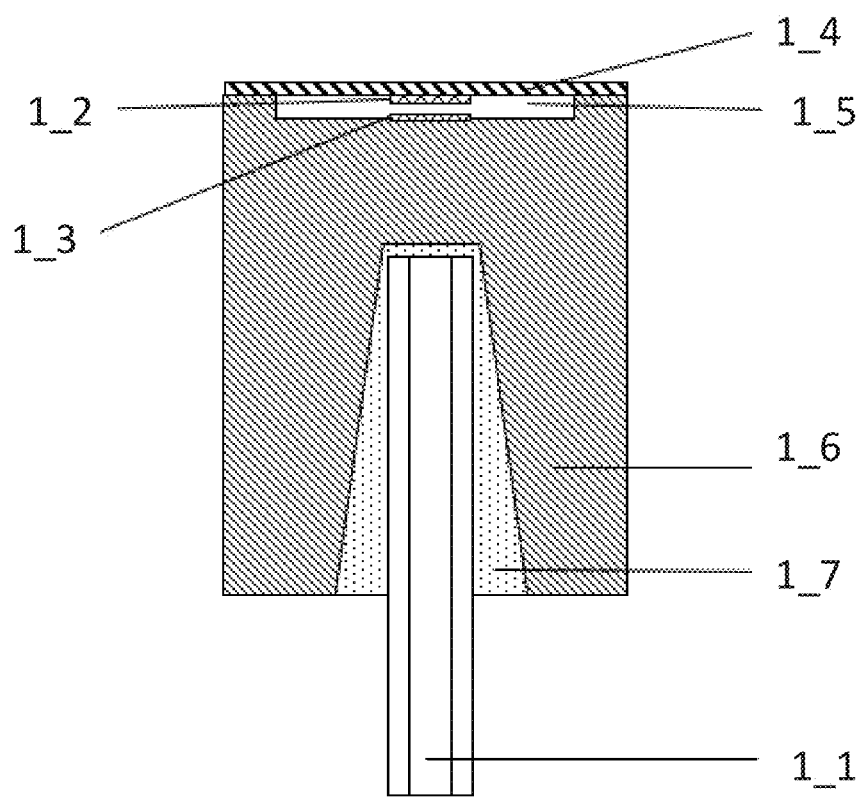
FIG. 1 is a schematic cross-sectional view of a certain Fabry-Perot sensor already existing.

To make the objectives, technical solutions, and advantages of technical solutions of the present disclosure clearer, in the following, the technical solutions of embodiments of the present disclosure will be clearly and completely described with reference to accompanying drawings for the specific embodiments of the present disclosure. In the drawings, like reference signs represent like components. It shall be noted that the described embodiments are some but not all of the embodiments of the present disclosure. All other embodiments obtained by a person of ordinary skill in the art based on the described embodiments of the present disclosure without inventive efforts shall fall within the protection scope of the present disclosure.

Unless otherwise defined, technical or scientific terms used herein shall have the usual meanings understood by those with ordinary skills in the art to which the present disclosure belongs. The terms "first", "second" and similar words used in the specification and claims of the present disclosure do not indicate any order, quantity or significance, but are only used to distinguish different components. Similarly, words such as "a" or "an" do not necessarily mean quantity limitation. Similar words such as "include" or "comprise" mean that an element or object appearing before the words covers an element or object listed after the words and their equivalents, but do not exclude other elements or objects. Similar words such as "connect" or "connected" are not limited to physical or mechanical connections, but can include electrical connections, whether direct or indirect. Words such as up", "down", "left", and "right" are only used to indicate the relative positional relationship. When the absolute position of the described object changes, the relative positional relationship may also change accordingly.

Unless the context specifically dictates or clearly states, the term "approximately" as used herein should be understood to be within the range of normal tolerances in the art. Unless otherwise clear from the context, all numerical values provided herein can be modified by the term "approximately".

I. Structure of a Fabry-Perot Sensor

Figures 5A, 5B:
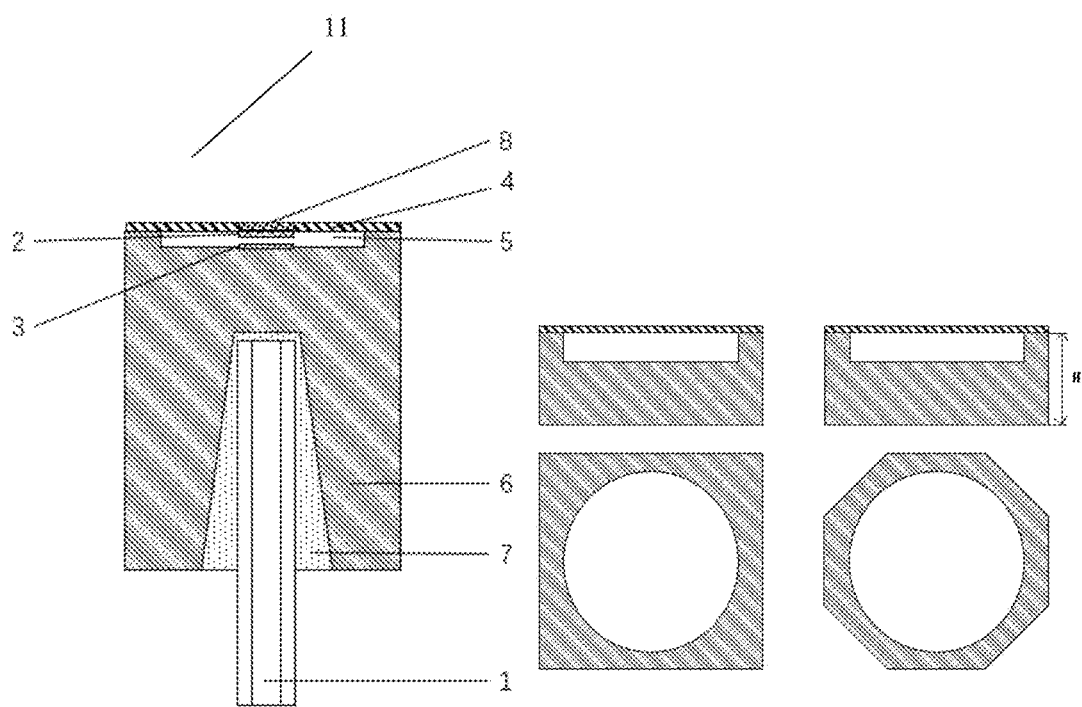
FIG. 5A is a cross-sectional view of a Fabry-Perot sensor proposed by the present disclosure.
FIG. 5B is a front view and a top view of two different configurations of the Fabry-Perot sensor.
Figure 10:
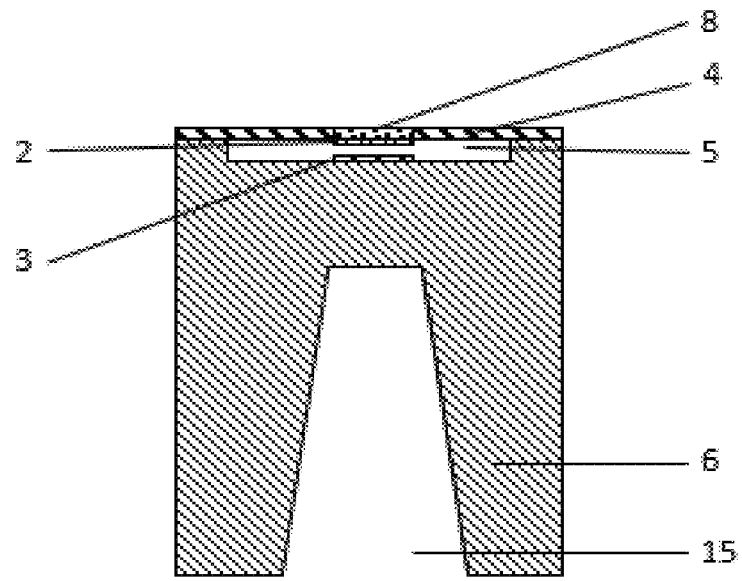
FIG. 10 is a schematic diagram of a base and a pressure sensitive diaphragm after vacuum bonding.
Figure 11:
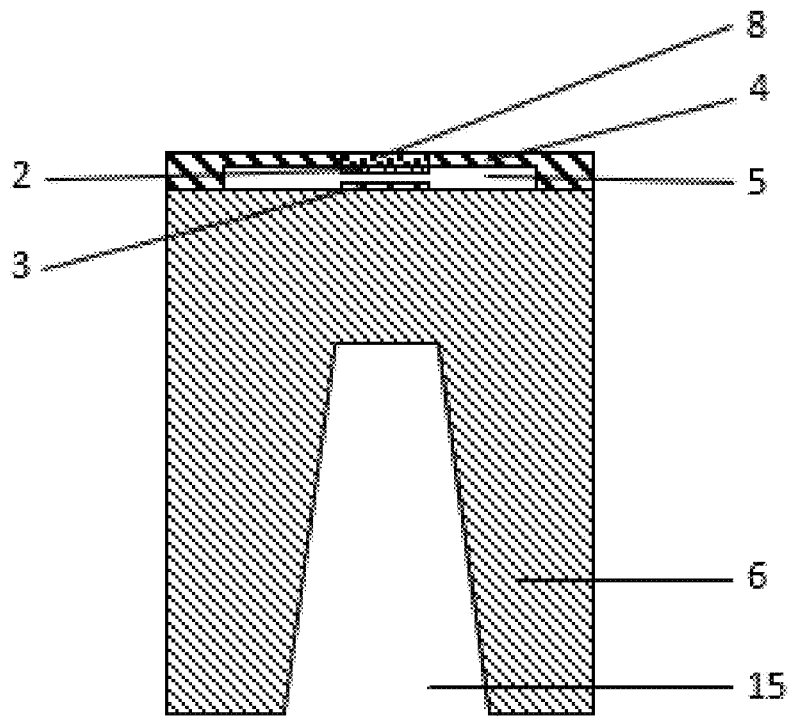
FIG. 11 is one embodiment of a Fabry-Perot sensor proposed by the present disclosure, in which a cavity is formed in a pressure sensitive diaphragm.

FIGS. 5A-B and 10 show schematic diagrams of a Fabry-Perot sensor 11 proposed by the present disclosure. In general, the Fabry-Perot sensor 11 mainly includes the following components: a base 6, a pressure sensitive diaphragm 4 fixed to the base 6, a cavity 5 formed between and closed by the base 6 and the pressure sensitive diaphragm, a first reflective film 2 and a second reflective film 3 located on the pressure sensitive diaphragm 4 and the base 6 respectively, and a fiber optic 1 fixed to the base 6 and used for conducting a light signal. The cavity 5 may also be referred to as a Fabry-Perot cavity. In preferred embodiments of examples in FIGS. 5A-B and FIG. 10, the cavity 5 is disposed in the base 6. Alternatively, as shown in the embodiment shown in FIG. 11, the cavity 5 can also be realized in the pressure sensitive diaphragm 4. Generally, the cavity 5 is formed to be in a vacuum state. The cavity may be a cavity with a circular cross section, as shown in FIG. 5B, but is not limited thereto.

The present disclosure is mainly implemented as a miniature sensor. For example, the pressure sensitive diaphragm may optionally have a thickness of 1 μm to 5 μm, and the base may optionally have a thickness (which is indicated by H in FIG. 5B) of 200 μm to 500 μm. For a circular cavity, a diameter thereof may be optionally from 80 μm to 300 μm.

The base 6 is preferably made of glass, but may also be made of other materials, such as including but not limited to single crystal silicon, silicon carbide, sapphire, etc., in order to achieve good light guiding performance. As shown in FIG. 5A, the base 6 includes a fiber optic receiving portion 15.

The first reflective film 2 and the second reflective film 3 may be selected from, but not limited to, Cr, Ti, Au, Ag, TaN, $Al_2O_3$, $Ta_2O_5$, dielectric film, and the like. The first reflective film 2 is located on the pressure sensitive diaphragm 4, and may be located either on a side of the pressure sensitive diaphragm 4 close to the cavity 5 or on a side of the pressure sensitive diaphragm 4 away from the cavity 5. The second reflective film 3 is located at the bottom of the cavity 5.

The fiber optic 1 is fixed to the base 6 at the fiber optic receiving portion 15, and may be selected from, but not limited to, a multi-mode quartz fiber optic 1. Preferably, the fiber optic 1 may be fixed by UV glue 7 that can not only play a fixing role, but also ensure good light guiding performance due to its dual functions of both bonding and light guiding.

As pressure changes, the pressure sensitive diaphragm 4 can be deformed toward or away from the base 6, changing the length of the cavity 5 and the distance between the first reflective film 2 and the second reflective film 3, and making it possible to sense the pressure. Specifically, when pressure measurement is performed, measurement light is introduced by the fiber optic 1. A portion of the measurement light generates reflected signal by the first reflective film 2, and the remaining light is reflected back to the first reflective film 2 through the second reflective film 3 and is superimposed on the lower surface of the first reflective film 2. A change in external pressure causes the pressure sensitive diaphragm 4 to deform, changing the length of the cavity 5 and thereby the optical path difference. By detecting the light signal transmitted back through the fiber optic 1, magnitude of deformation of the pressure sensitive diaphragm 4 can be obtained through demodulation.

As mentioned above, for the existing Fabry-Perot sensor design as shown in FIG. 1, deformation of the pressure sensitive diaphragm 4 exhibits a very significant nonlinearity, especially when the pressure sensitive diaphragm 4 has a small thickness or when there is a large pressure range. This characteristic restricts the improvement of sensor performance and limits its application occasions. For the existing Fabry-Perot sensor design shown in FIG. 2, although it has a certain improvement in nonlinearity, an additional second layer has to be added, bringing about many problems such as a complicated structure of the pressure sensitive diaphragm, manufacturing difficulties, reduced overall sensitivity and reduced service life.

Figure 2:
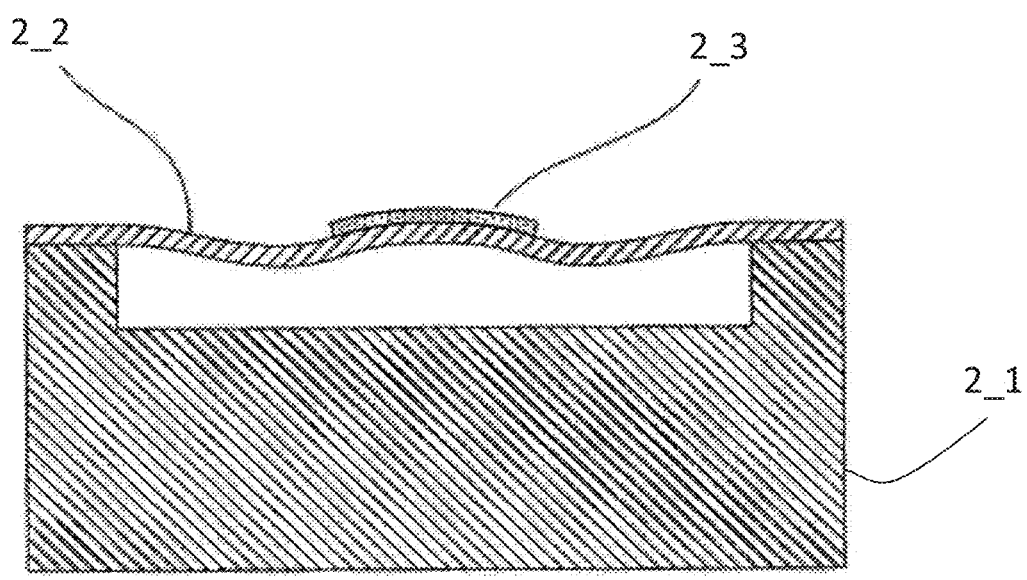
FIG. 2 is a partial schematic diagram of another Fabry-Perot sensor already existing.
Figure 3:
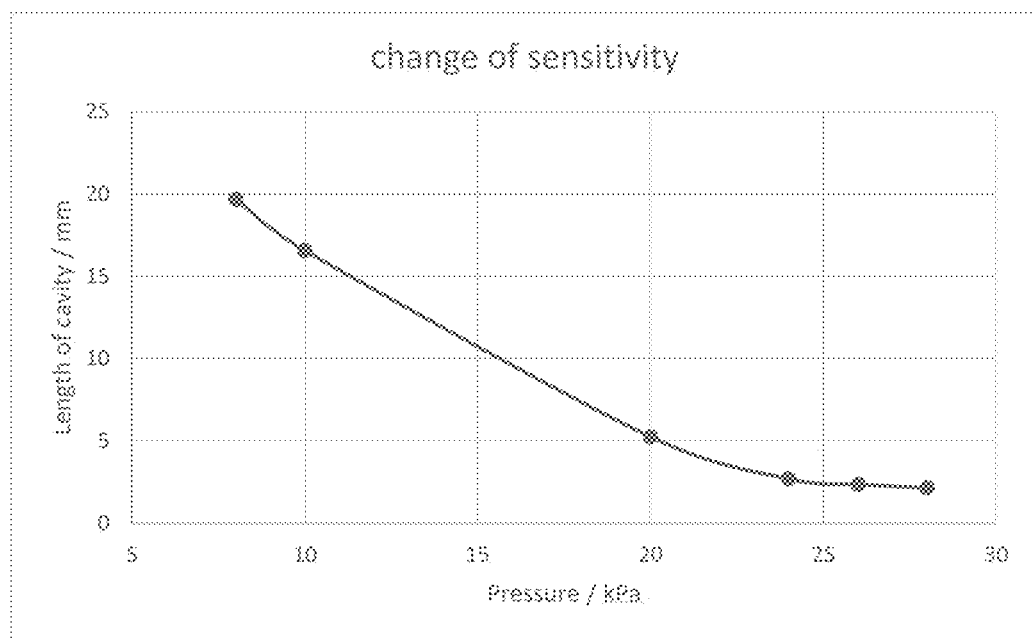
FIG. 3 is a curve showing changes in the sensitivity of the sensor for different pressures when the Fabry-Perot sensor shown in FIG. 1 is used.

In order to improve the serious non-linearity problem of the existing Fabry-Perot sensor shown in FIG. 1 while avoiding sacrifice of performance in terms of structure, sensitivity and processing method in the existing Fabry-Perot sensor shown in FIG. 2, the present disclosure proposes a novel design and a novel manufacturing method of the sensor, which uses a substance doping method to generate local stress concentration area on the pressure sensitive diaphragm 4, achieving reduction in non-linearity of the sensor while maintaining a single-layer pressure sensitive diaphragm structure. The pressure sensitive diaphragm 4 with stress concentration area will be described in more detail below.

The pressure sensitive diaphragm 4 includes a base material, and has at least one local areas 8, each local area 8 having a doping substance doped into the base material of the pressure sensitive diaphragm 4 to generate stresses, and any of the local areas 8 not penetrating the entire thickness of the pressure sensitive diaphragm 4. The pressure sensitive diaphragm 4 exhibits a wavy configuration under the action of the stresses. The doping of material does not change the single-layer structure of the diaphragm, that is, the pressure sensitive diaphragm 4 is still an integrated single-layer structure. This not only avoids the aforementioned many problems in the existing double-layer diaphragm structure, but also avoids the complicated technical steps for the construction thereof. The local area 8 doped with a substance may also be referred to as a doped area.

By means of substance doping, internal stresses are generated in the doped area, and cause the pressure sensitive diaphragm 4 to exhibit uneven wavy effects as shown in FIGS. 12A-15, at least including one wave crest at the middle of the pressure sensitive diaphragm, and an annular wave trough separated radially from the wave crest. In embodiments shown in FIGS. 12A-15, the pressure sensitive diaphragm cambers upward (i.e., away from a base) at the center to form a wave crest, but the diaphragm may also camber downward (i.e., toward the base) at the center to form a wave trough, that is, it may have a wave trough located at the middle of the pressure sensitive diaphragm, and an annular wave crest spaced radially from the wave trough. In addition, the pressure sensitive diaphragm 4 may exhibit multiple wave crests and troughs.

In the experiment, it is found that the wavy pressure sensitive diaphragm realized by doping at local area has a better linearity with pressure change than the double-layer diaphragm. Although there is no theoretical basis, analysis of experiment results suggests that a first reason may be the more optimized wavy shape of the single-layer diaphragm. On the one hand, stresses can be injected into the interior of the pressure sensitive diaphragm by doping, rather than just being applied to the surface of the diaphragm as in existing the double-layer structure, so that it is easier to control the wavy deformation shape of the diaphragm itself, making it is easier to realize a more optimized and reasonable wavy structure. On the other hand, since there is no additional layer structure, its wavy configuration is not restricted or affected by the additional layer structure, that is, factors affecting the optimized wavy configuration are eliminated. In addition, a second reason may be that the pressure sensitive diaphragm of the double-layer structure causes unevenness in the structure of the pressure sensitive diaphragm. In a state of a specific diaphragm position, the unevenness in the structure may affect further response of the diaphragm to pressure. The solution of the present disclosure solves the above problems, thereby improving performance.

In order for the diaphragm to produce the wavy configuration shown in FIGS. 12A-15 when local stresses are released, the local area 8 cannot extend the entire thickness of the pressure sensitive diaphragm 4. Specifically, the local area may be located in a part of the thickness of the pressure sensitive diaphragm 4 close to the cavity 5 or in a part of the thickness of the pressure sensitive diaphragm 4 away from the cavity 5, but do not extend the entire pressure sensitive diaphragm 4.

Figure 4:
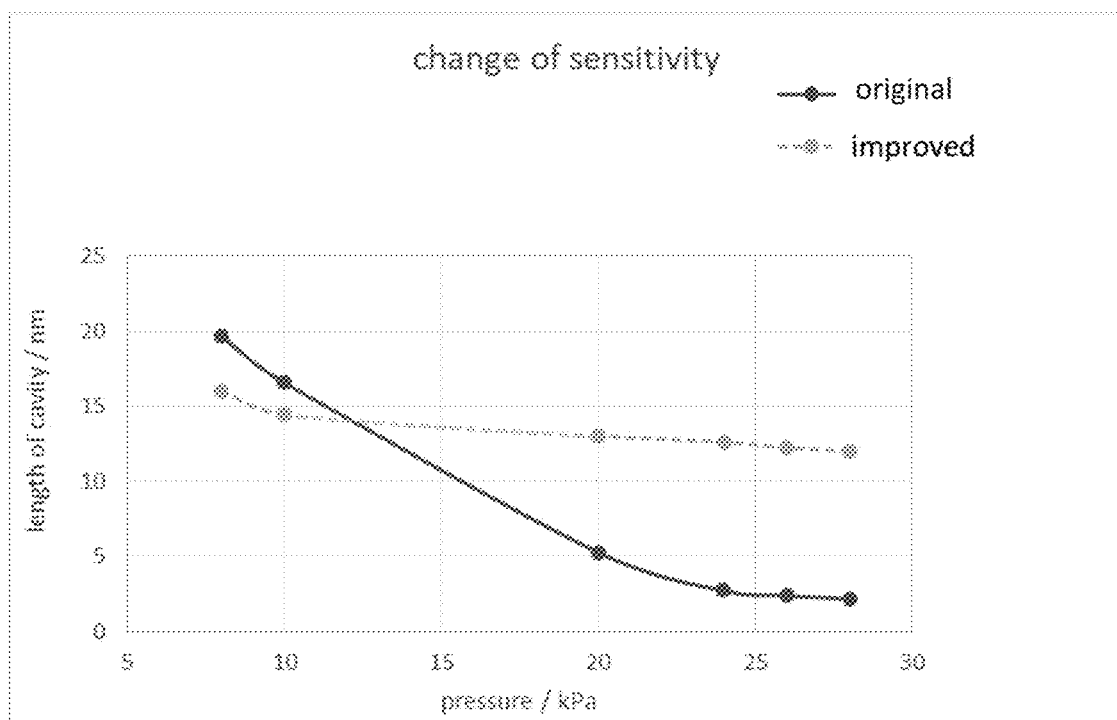
FIG. 4 is a curve showing changes in sensitivity of the sensor for different pressures when a Fabry-Perot sensor proposed by the present disclosure is used, and the curve is given in contrast to the curve measured when the traditional Fabry-Perot sensor is used.
Figure 7A:
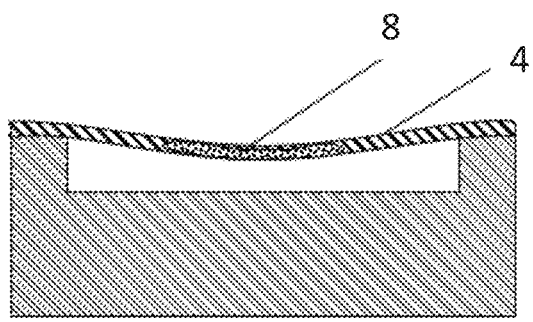
FIGS. 7A and 7B are cross-sectional views of one embodiment of a Fabry-Perot sensor proposed by the present disclosure, which show respectively schematic diagrams of deformation of an area of a pressure sensitive diaphragm that is not doped with a substance and of an area thereof that is doped with a substance when external intensity of pressure is different for the Fabry-Perot sensor.
Figure 7B:
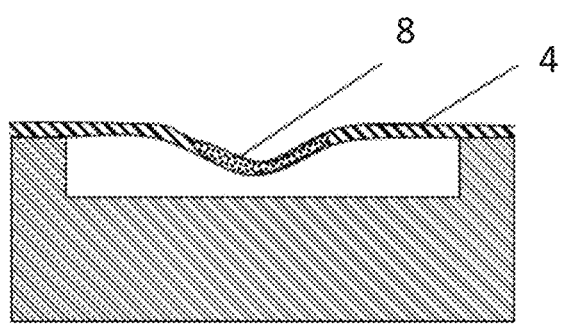

Due to the wavy effect of the diaphragm and the stress effect brought about thereby, non-linear characteristics of the pressure sensitive diaphragm 4 under the same stresses are improved. As shown in FIG. 7A, when external pressure intensity is small, the deformation of an area of the pressure sensitive diaphragm 4 that is not doped with a substance is relatively large, while the deformation of an area that is doped with a substance is relatively small. As shown in FIG. 7B, when external pressure intensity is large, the deformation of an area of the pressure sensitive diaphragm 4 that is not doped with a substance is relatively small, while the deformation of an area that is doped with a substance is relatively large. The overall deformation displacement of the pressure sensitive diaphragm 4 is a composite result of the above two reasons, therefore improving the sensitivity non-linearity problem. As shown in FIG. 4, a dotted line shows changes in sensitivity when a Fabry-Perot sensor of the present disclosure is used. Compared with a Fabry-Perot sensor without stresses, degree of nonlinearity is significantly reduced with the Fabry-Perot sensor of the present disclosure.

The base material constituting the pressure sensitive diaphragm 4 includes but is not limited to single crystal silicon. The doping material includes P, B, As, Al, Ga, Sb, Ge, O, Au, Fe, Cu, Ni, Zn, and Mg, preferably boron. According to the position of the doping material in a lattice of a semiconductor material, the doping material may be divided into a substitution type and an interstitial type. Doping material of substitution type includes P, B, As, Al, Ga, Sb, Ge, etc., and doping material of interstitial type includes O, Au, Fe, Cu, Ni, Zn, Mg, etc.

Figure 6A:
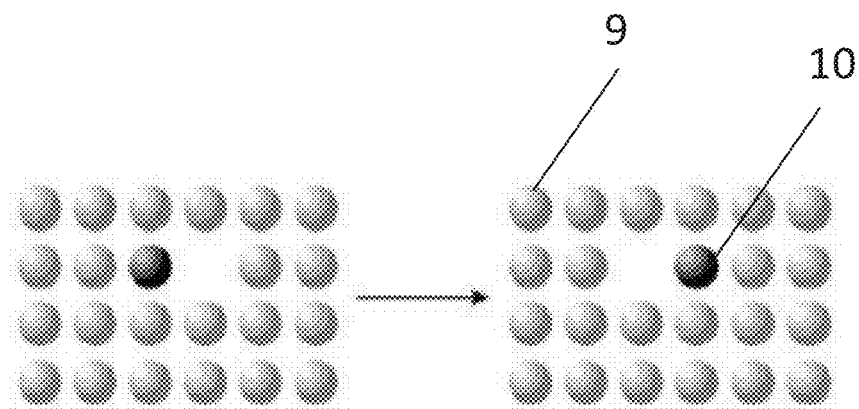
FIGS. 6A and 6B are schematic diagrams showing substance doping at the center of a pressure sensitive diaphragm of a Fabry-Perot sensor.
Figure 6B:
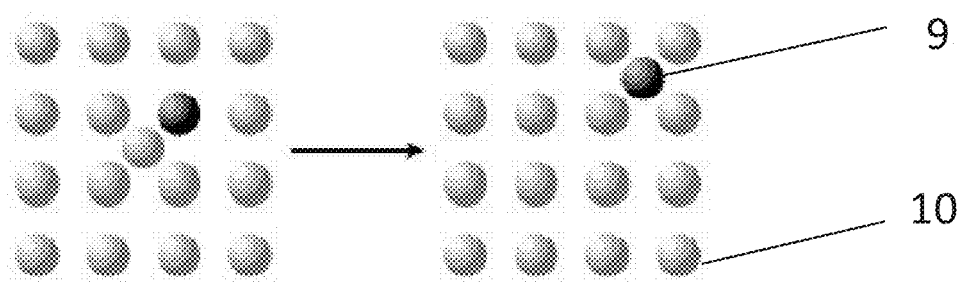

During doping, the doping substance and the base material constituting the substrate of the pressure sensitive diaphragm are doped at atomic or molecular level, as shown in FIGS. 6A-B. Optional doping methods include interstitial doping, direct exchange doping, vacancy doping, push interstitial doping, extrusion doping, and Frank-Turnbull doping. Preferably, vacancy doping or push interstitial doping is used. Specifically, FIG. 6A shows vacancy diffusion, in which a molecule or atom 9 of a doped material moves in the vacancy between molecules or atoms 10 of a base material. Since activation energy required for vacancy diffusion is relatively small, this method is easy to perform. FIG. 6B shows push interstitial diffusion, in which a molecule or atom 9 of a doped material occupies a lattice position, a molecule or atom 10 of a base material at which is moved to an interstitial position and becomes a self-interstitial molecule or atom. Due to forces between molecules or atoms, stresses may be generated in the doped area. The stresses may be tensile stresses or compressive stresses. The magnitude of the stresses depends on the degree of mismatch in lattice and the concentration of substance doping.

Based on the above principles, the position of doped area and the type of stress can be flexibly selected. The doped area may be a substantially circular area located at the center of the pressure sensitive diaphragm 4, or may be a substantially annular area surrounding the center of the pressure sensitive diaphragm 4, or there may be at least one concentric circular area and at least one annular area at the same time. According to a possible embodiment, there may be different doping materials in different doped areas, or in a same doped area.

FIGS. 12A-15 show several possible embodiments of a Fabry-Perot sensor.

Figure 12A:
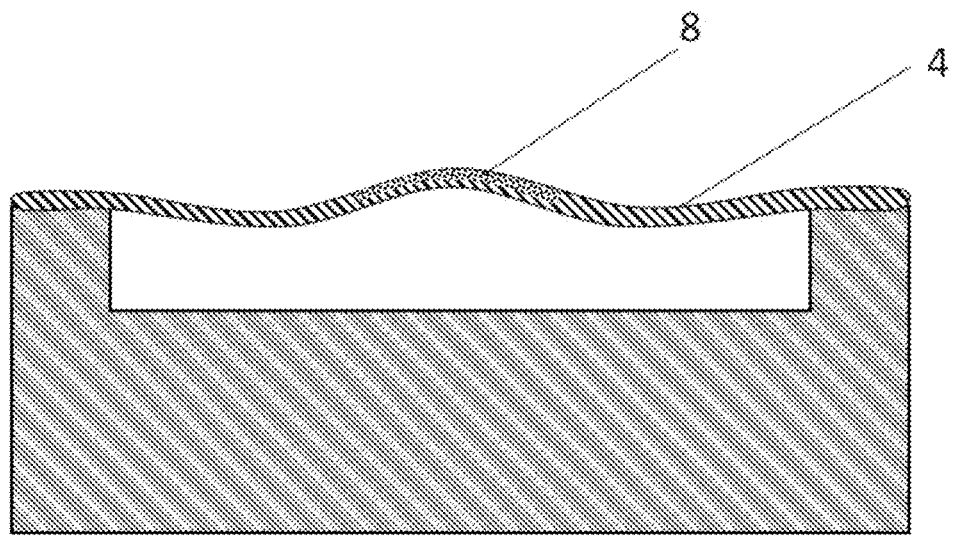
FIGS. 12A and 12B are two embodiments of a Fabry-Perot sensor proposed by the present disclosure, a substance being doped in a shallow circular area on one side of a pressure sensitive diaphragm.
Figure 12B:
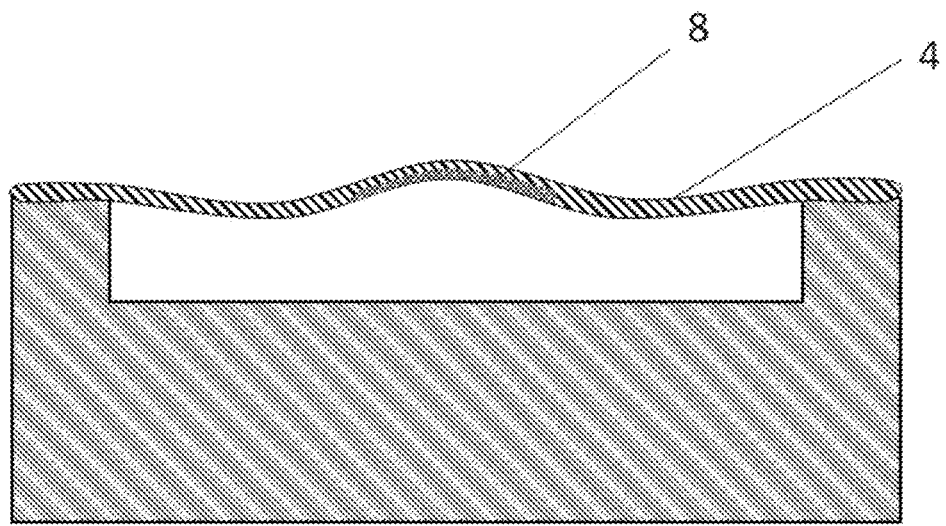

As shown in FIG. 12A, a circular area at the center of a pressure sensitive diaphragm 4 is doped with a substance that generates tensile stresses. The circular area is located in an upper part of the pressure sensitive diaphragm 4 and does not extend its entire thickness. As shown in FIG. 12B, a circular area of a pressure sensitive diaphragm 4 of a Fabry-Perot sensor is doped with a substance that generates compressive stresses. The circular area is located in a lower part of the pressure sensitive diaphragm 4 and does not extend its entire thickness.

Figure 13A:
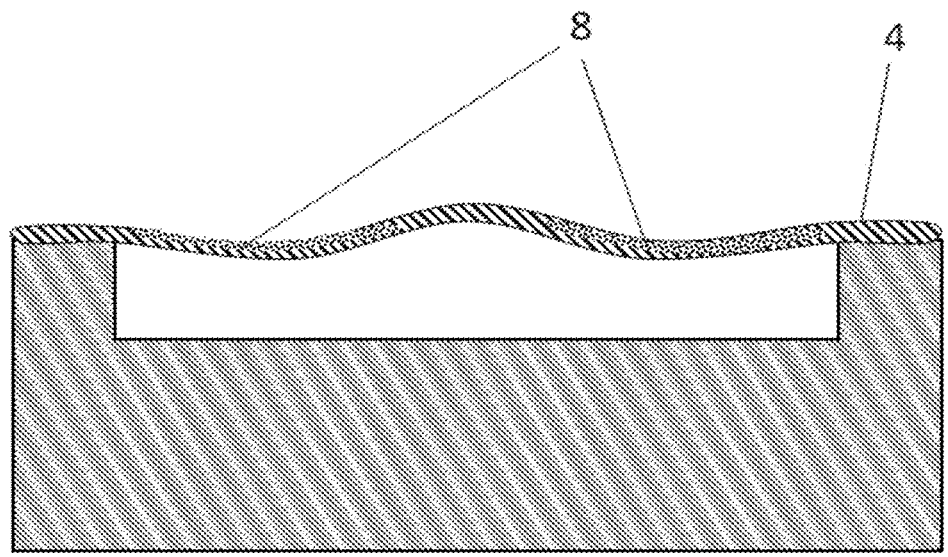
FIGS. 13A and 13B are two embodiments of a Fabry-Perot sensor proposed by the present disclosure, a substance being doped in a shallow annular area on one side of a pressure sensitive diaphragm.
Figure 13B:
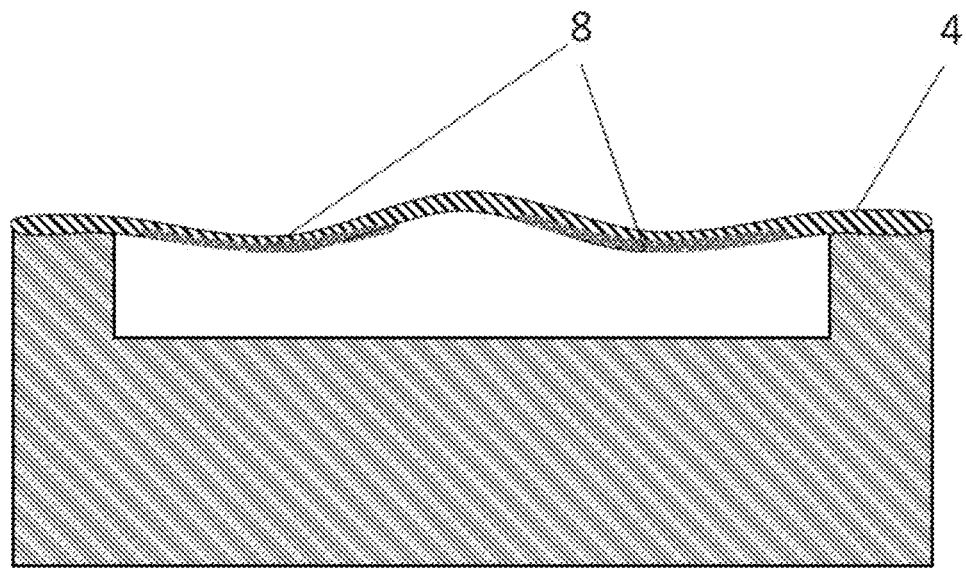

As shown in FIG. 13A, an annular area of a pressure sensitive diaphragm 4 of a Fabry-Perot sensor is doped with a substance that generates compressive stresses. The annular area is located in an upper part of the pressure sensitive diaphragm 4 and does not extend its entire thickness. As shown in FIG. 13B, an annular area of a pressure sensitive diaphragm 4 of a Fabry-Perot sensor is doped with a substance that generates tensile stresses. The annular area is located in a lower part of the pressure sensitive diaphragm 4 and does not extend its entire thickness.

Figure 14A:
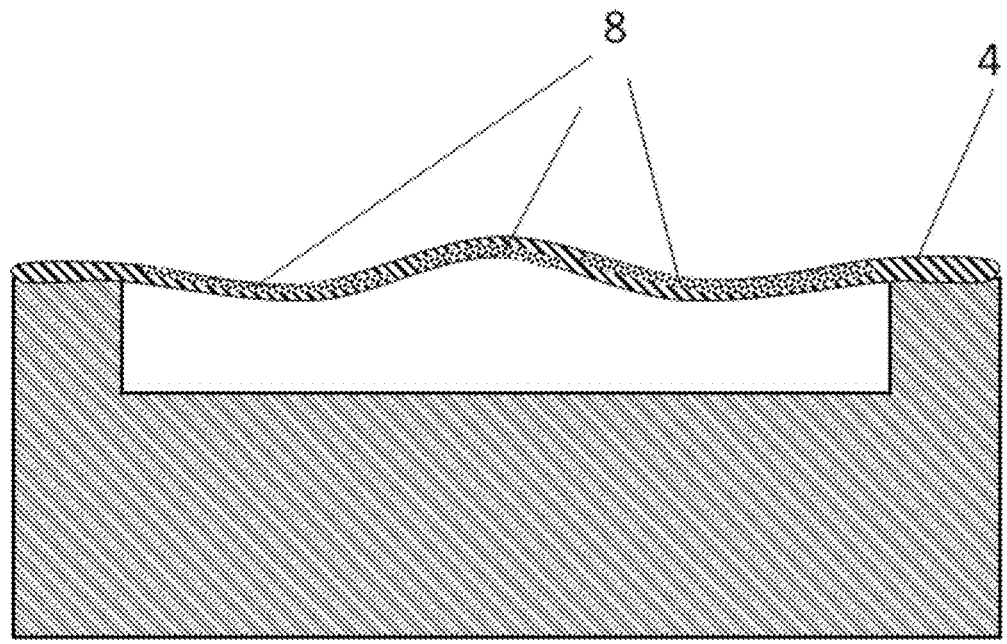
FIGS. 14A and 14B are two embodiments of a Fabry-Perot sensor proposed by the present disclosure, in a pressure sensitive diaphragm of the sensor, a circular area and an annular area that are concentric being doped with different substances.
Figure 14B:
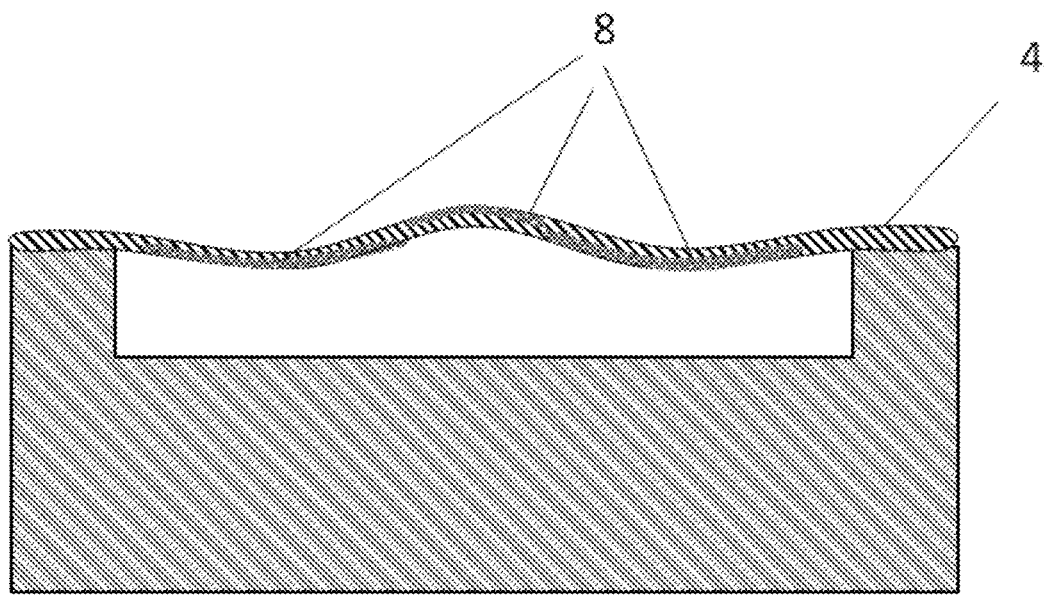

As shown in FIGS. 14A-B, different substances are dope in circular and annular areas. In FIG. 14A, a circular area in a lower part of a pressure sensitive diaphragm 4 of a Fabry-Perot sensor is doped with a substance that generates compressive stresses, and an annular area in an upper part of the pressure sensitive diaphragm 4 is doped with a substance that generates compressive stresses. In FIG. 14B, a circular area in an upper part of a pressure sensitive diaphragm 4 of a Fabry-Perot sensor is doped with a substance that generates tensile stresses, and an annular area in lower part of the pressure sensitive diaphragm 4 is doped with a substance that generates tensile stresses.

Figure 15:
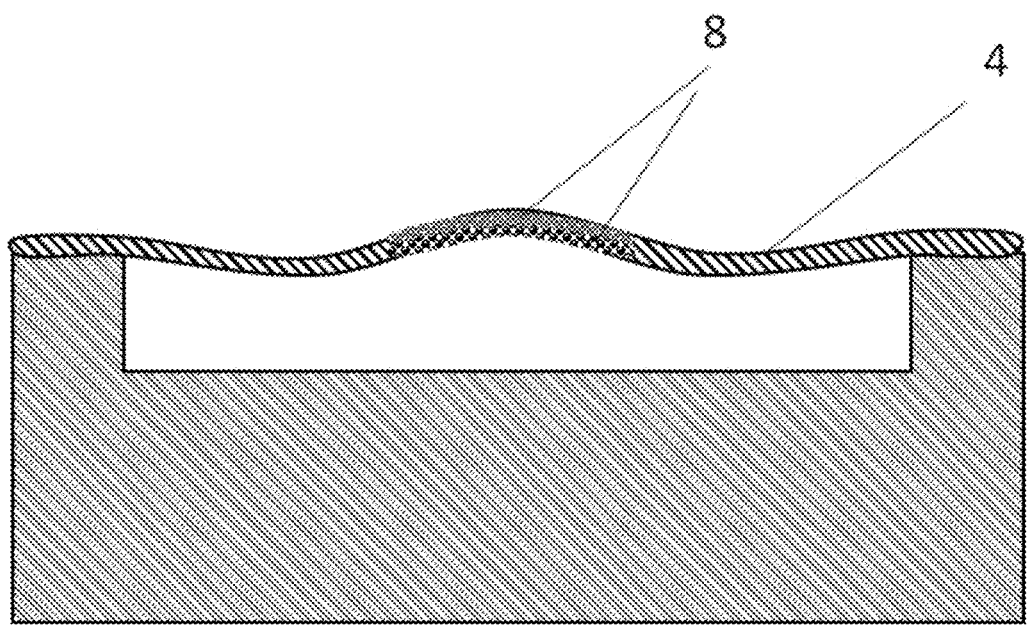
FIG. 15 is one embodiment of a Fabry-Perot sensor proposed by the present disclosure, substances with opposite stresses being doped on either sides of a pressure sensitive diaphragm of the sensor.

As shown in FIG. 15, an upper part of a circular area of a pressure sensitive diaphragm 4 is doped with a substance that generates tensile stresses, and a lower part thereof is doped with a substance that generates compressive stresses. The combined force of the upper and lower areas will produce a force that enables the diaphragm center to camber upward.

The above Fabry-Perot sensor formed by substance doping has many advantages, including but not limited to: by means of substance doping, it can effectively reduce the nonlinearity of the sensor and improve the applicability of the sensor in different ranges; while reducing the nonlinearity of the sensor, the single-layer structure of the sensor diaphragm is ensured, and the above-mentioned many problems caused by the existing double-layer structure are avoided; in addition, due to injecting stresses into the interior of the pressure sensitive diaphragm in the doping method, more optimized wavy deformation can be achieved, and the nonlinearity is further weakened. Furthermore, the above Fabry-Perot sensor also has advantages in terms of manufacturing method. This will be described in detail below.

II. Manufacturing Method of Fabry-Perot Sensor

Figure 8:
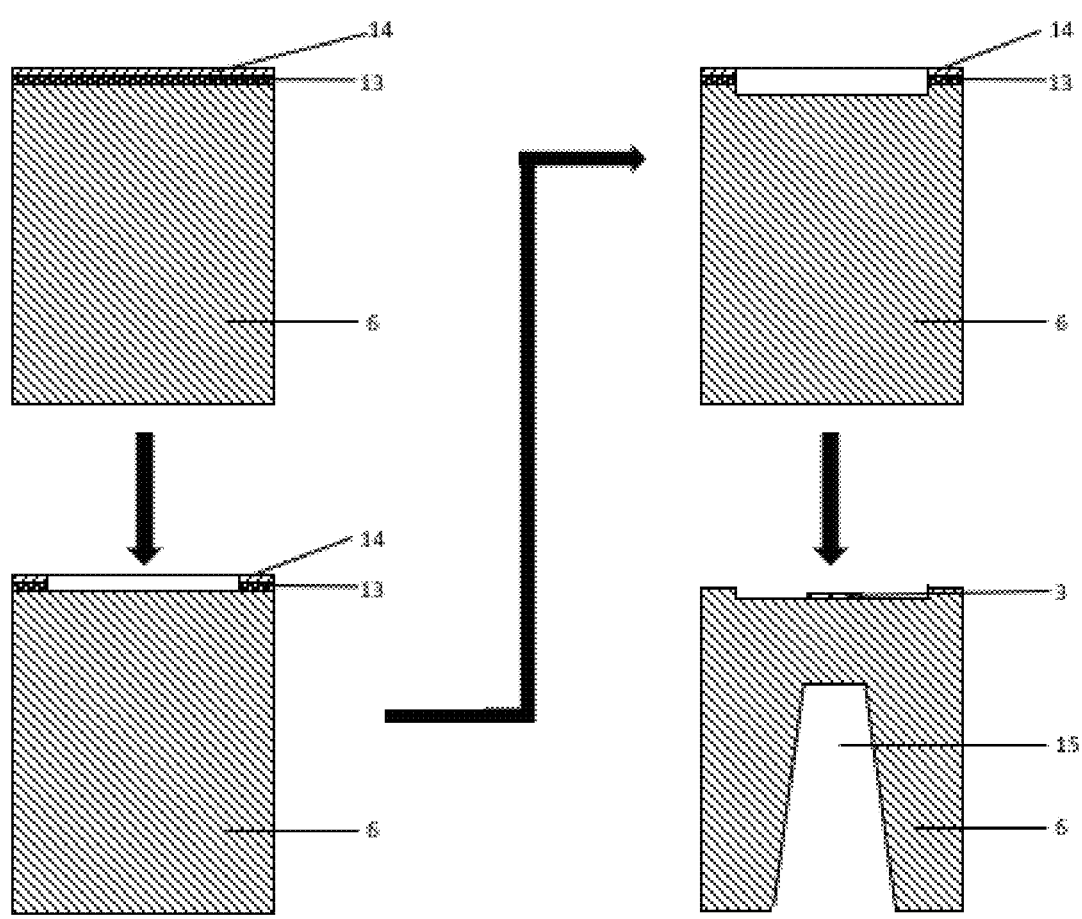
FIG. 8 is a schematic diagram of a processing flow of a base of a Fabry-Perot sensor.
Figure 9:
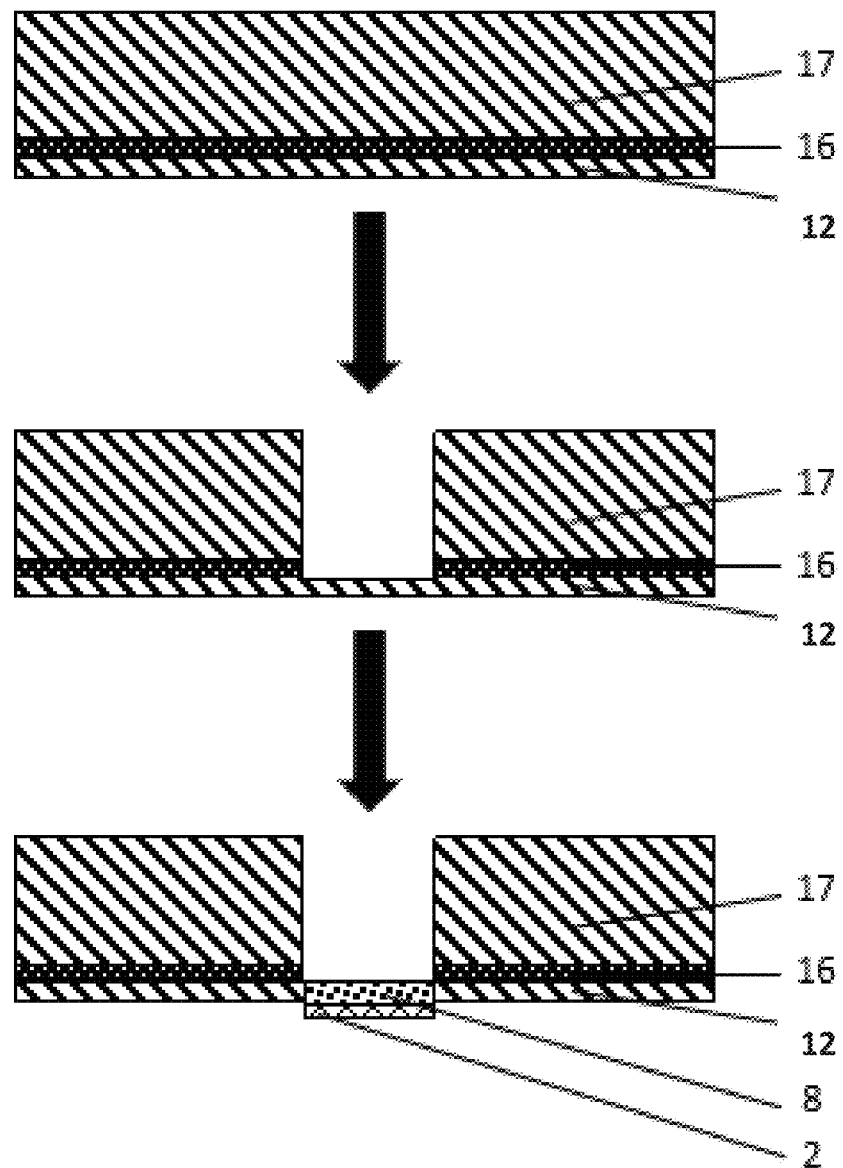
FIG. 9 is a schematic diagram of a processing flow of a pressure sensitive diaphragm of a Fabry-Perot sensor.

FIGS. 8 to 9 show some steps of a preferred method of manufacturing a Fabry-Perot sensor 11 according to the present disclosure. The manufacturing of the Fabry-Perot sensor 11 may mainly include steps of manufacturing a base 6, manufacturing a pressure sensitive diaphragm 4, bonding the base 6 with the pressure sensitive diaphragm 4, cutting, and mounting a fiber optic 1, and the steps will be respectively described in detail below.

It should be noted that the steps listed below are preferred steps for manufacturing the sensor of the present disclosure, not necessarily necessary steps. Based on the content described below, those skilled in the art can also modify or omit a specific operation, add a specific operation, or adjust the order of at least one specific operation steps according to specific conditions.

2.1. Manufacturing of Pressure Sensitive Diaphragm

Step 1. A pressure sensitive diaphragm substrate for producing a pressure sensitive diaphragm 4 is provided. The pressure sensitive diaphragm substrate finally forms the main part of the pressure sensitive diaphragm 4. Generally, multiple pressure sensitive diaphragms or multiple sensors can be manufactured one time, that is, the pressure sensitive diaphragm substrate can be finally cut into multiple pressure sensitive diaphragms.

Preferably, a silicon-on-insulator (SOI) wafer is used as the pressure sensitive diaphragm substrate. The SOI wafer is formed by thermal bonding of a thin silicon substrate 12 (which ultimately forms the main part of the pressure sensitive diaphragm 4), a silicon dioxide layer 16 and a thick silicon layer 17 (or referred to as a handle layer), and SOI wafers with different thicknesses of silicon substrates are available from the market.

Alternatively, a silicon substrate with silicon oxide or silicon dioxide layer formed thereon can also be selected as the pressure sensitive diaphragm substrate. Specifically, after cleaning the silicon substrate, a silicon dioxide layer is formed on the silicon substrate by thermal oxidation growth. The thermal oxidation process may be selected from, but not limited to, dry oxygen oxidation, water vapor oxidation, wet oxygen oxidation, $H_2$ and $O_2$ heating oxidation, RTO, etc.

Hereinafter, description is given by an example where the pressure sensitive diaphragm 4 is manufactured by using an SOI wafer.

The step 1 may include cleaning the SOI wafer to remove impurities on the surface of the wafer. The cleaning step of the SOI wafer can include at least one of the following steps: selecting a mixed solution of $H_2SO_4:H_2O=4:1$ for cleaning to remove an organic on the surface, where cleaning temperature is 120° C., and cleaning time is 10 minutes; selecting a mixed solution of $NH_4OH$ (28%):$H_2O_2$ (30%): $H_2O=1:1:5$ to remove fine dust on the surface, where cleaning temperature is 80° C., and cleaning time is 10 minutes; selecting a mixed solution of $HCl:H_2O_2:H_2O=1:1:6$ to remove a metal ion on the surface, where cleaning temperature is 80° C., and cleaning time is 10 minutes; and selecting a mixed solution of $HF:H_2O=1:50$ to remove an oxide layer on the surface, where cleaning temperature is room temperature.

After cleaning, the SOI wafer is dried. Preferably, pre-baking is performed at 100° C. for 10 minutes.

Step 2: substance doping is performed in a local area of the pressure sensitive diaphragm substrate to generate stresses in the local area.

The step 2 may specifically include spin-coating a photoresist 14 on the SOI wafer and performing a patterning operation, that is, partially removing the photoresist to expose a local area that needs to be doped with a substance, as shown in FIG. 9. Specifically, first, a part of the thickness of the thick silicon layer 17 can be removed by grinding, and then an EDP solution is used to make chemical etching. The silicon dioxide layer 16 serves as the first etching self-stop layer. Once the silicon dioxide layer 16 is etched, the etching rate can be reduced by more than 10,000 times. The silicon dioxide layer 16 can be removed by etching with a buffered HF solution. Since the etching rate of silicon in the HF solution is 10,000 times smaller than that of silicon dioxide, the silicon substrate 12 (finally forming the pressure sensitive diaphragm 4) may not be etched in the HF solution, and thus, the local areas to be doped with the substance are exposed, as shown in FIG. 9. If the pressure sensitive diaphragm substrate finally forms only one pressure sensitive diaphragm, the local area may include only a substantially circular area, a substantially annular area, or a combination of concentric circular area(s) and annular area(s) for doping and ultimately forming a wavy structure of the diaphragm. If the pressure sensitive diaphragm substrate is finally cut into multiple pressure sensitive diaphragms, multiple spaced-apart local areas/local areas combinations are simultaneously formed on the pressure sensitive diaphragm substrate in this step, so as to finally form multiple wavy areas, and the multiple wavy areas are finally cut into different pressure sensitive diaphragms.

Optionally, the thickness of the pressure sensitive diaphragm 4 can be accurately controlled by grinding.

Second, the exposed area is doped with a substance. Doping may be selected from, but not limited to, high temperature diffusion and ion implantation.

For high temperature diffusion, it may be selected from, but not limited to, solid source diffusion (such as BN), liquid source diffusion (such as B, P), gaseous source diffusion, rapid gas phase diffusion, gas immersion laser diffusion, etc. Diffusion source may be selected from, but not limited to, P, B, As, Al, Ga, Sb, Ge, O, Au, Fe, Cu, Ni, Zn, and Mg. According to a preferred embodiment, concentrated boron diffusion or phosphorus diffusion is adopted. Parameters such as diffusion temperature, diffusion concentration, and annealing temperature in a diffusion process influence sensitivity of a Fabry-Perot sensor, and preferably, in concentrated boron diffusion, diffusion temperature is 900° C.~1200° C., concentration after diffusion is $10^{17}$~$10^{21}$/cm$^3$; in phosphorus diffusion, diffusion temperature is 900° C.~1200° C., and concentration after diffusion is $10^{18}$~$5*10^{21}$/cm$^3$. For the silicon substrate 12, it can also be doped directly by mask, lithography, development and other processes.

For ion implantation, implanted ions may be selected from, but not limited to, using B, P, and As, and an ion source may be selected from, but not limited to, $BF_3$, $PH_3$, $AsH_3$ and so on.

As mentioned above, the doping should be performed on a part of the thickness of the pressure sensitive diaphragm 4. According to different doping materials, the stresses formed in the local area 8 of the pressure sensitive diaphragm 4 substrate may be tensile stresses or compressive stresses.

Step 3, the pressure sensitive diaphragm 4 is cleaned after doping to remove impurities on the surface of the pressure sensitive diaphragm 4. The cleaning is performed by the method in the above step 1.

Step 4. the cleaned pressure sensitive diaphragm 4 is annealed to remove the damage of the pressure sensitive diaphragm 4 caused by the doping process such as ion implantation, and restore the silicon lattice to its original perfect crystal structure while allowing a substance to enter into an electrically active position, that is, a substitution position. The high temperature annealing may be selected from, but not limited to, thermal annealing, rapid heat treatment, rapid annealing, etc. The thermal annealing temperature is about 400° C.~1000° C., and the rapid annealing temperature is about 600° C.~1100° C.

Step 5, as shown in FIG. 9, a reflective film 2 is grown on the bottom of the pressure sensitive diaphragm 4 after doping the substance, which is configured to form the cavity 5 to obtain an optical reflection signal, so as to form interference, and also avoid a resonant cavity formed on inner and outer surfaces of the pressure sensitive diaphragm 4; and the method of growing the reflective film 2 may be selected from, but not limited to, evaporation, sputtering, chemical vapor deposition, electrochemistry, epitaxial growth, etc. The reflective film 2 should be as thin as possible, and produce the stresses effects as small as possible, and it may be a metal layer, and may be selected from, but not limited to, Cr, Ti, Au, Ag, TaN, $Al_2O_3$, $Ta_2O_5$, dielectric film, etc., which has high reflectivity.

2.2. Manufacturing of Base

Step 1, an untreated base is provided. In the case of producing multiple sensors one time, the untreated base provided at this time will finally be cut into multiple bases 6. The base preferably has a thickness of 200-500 μm. The base 6 is cleaned to remove impurities on the substrate surface. For cleaning, a mixed solution of $H_2SO_4:H_2O=4:1$ may be selected to remove an organic on the surface, where cleaning temperature is 120° C. and cleaning time is 10 minutes. After cleaning, the base 6 is pre-baked at 100° C. for 10 minutes.

Step 2, as shown in FIG. 8, a mask 13 is grown on the base 6. The method for growing the mask 13 may be selected from, but not limited to, evaporation, sputtering, chemical vapor deposition, electrochemistry, epitaxial growth, etc. The mask 13 may be selected from, but not limited to, Au, Ag, Cr, Ti, Cu, W, TiN, TaN, $Si_3N_4$, SiON, SiGe, metal alloy, or a combination of several materials. Preferably, a chromium metal mask 13 with a thickness of 1000 angstroms is grown on the base 6.

Step 3, as shown in FIG. 8, a photoresist 14 is spin-coated on the mask 13, and a part of the photoresist 14 can be removed by existing exposure and development techniques to form an exposed area that meets a specific shape. Although the diameter of the cavity 5 may be of various sizes, it is preferable to select the cavity 5 with a diameter of about 80-300 μm, which can not only ensure good reflection of the pressure sensitive diaphragm 4 but also ensure good mechanical characteristics of the sensor. After the photoresist 14 is partially removed, the exposed mask 13 may be removed by a chromium etching solution. The chromium etching solution is composed of HCl and glycerin. After the exposed mask 13 is removed, a part of the base 6 is exposed.

Step 4, as shown in FIG. 8, the base 6 is etched to form the cavity 5. Etching may be selected from, but not limited to, wet etching and dry etching. A chemical solution for wet etching may be selected from, but not limited to, HF and BOE solutions; dry etching may be selected from, but not limited to, sputtering and ion milling, plasma etching, reactive ion etching, HDP, ICP, ALE, ICP-RIE, HWP, and ECR; sputtering and ion milling may be selected from, but not limited to, inert gas (such as Ar), and plasma etching may be selected from, but not limited to, fluorocarbon (such as $CF_4$, $CHF_3$, $C_2F_6$, and $C_3F_8$). In this example, it is preferable to use a buffered HF solution to etch the cavity 5 with a diameter of 80-300 μm and a depth of approximately 19 μm. The buffered HF solution is composed of a mixed solution of 3 ml water and 2 g $NH_4F$ and a 48% HF solution according to the ratio of 4:1. The length of the cavity 5 in the base 6 should be controlled within a certain range to meet the requirements of optical interference intensity. In the case of producing multiple sensors one time, multiple cavities 5 are formed in the base at this time, and after the final cutting, each base will have only one cavity.

Step 5, as shown in FIG. 8, in order to obtain a better optical contrast signal, a reflective film 3 is grown on the bottom of the cavity 5 as a mirror of the cavity 5. The method for growing the reflective film 3 may be selected from, but not limited to, evaporation, sputtering, chemical vapor deposition, electrochemistry, epitaxial growth, etc. The material of the reflective film 3 may be different oxides, and may be selected from, but not limited to, Au, Ag, Cr, TaN, $Al_2O_3$, $Ta_2O_5$, dielectric film, etc.

Step 6, after the reflective film 3 is grown, a mixed solution of $H_2SO_4$:$H_2O$=4:1 may be selected to clean and remove an organic on the surface of the base 6, and preferably, cleaning temperature is 120° C., and cleaning time is 10 minutes. After cleaning, the base 6 may be pre-baked at 100° C. for 10 minutes for drying.

Step 7, in order to facilitate alignment and fixation of the fiber optic 1, a fiber optic receiving portion 15 may be formed on the bottom of the base 6. The forming method of the fiber optic receiving portion 15 may be selected from, but not limited to: laser processing, wet etching, dry etching, and mechanical drilling. The angle of the fiber optic receiving portion 15 may be greater than 15°. Alternatively, in order to ensure greater bonding strength, a hole-punching method may not be used, but a glass capillary is applied as a bonding material to obtain a larger contact area with the fiber optic 1.

2.3. Bonding of Pressure Sensitive Diaphragm 4 and Base 6

After the preliminary manufacture of the pressure sensitive diaphragm 4 and the base 6 is completed according to the above steps, the pressure sensitive diaphragm 4 and the base 6 are bonded. It may specifically include the following steps.

Step 1, the prepared pressure sensitive diaphragm 4 and the base 6 are bonded in a vacuum environment. The pressure sensitive diaphragm 4 and the base 6 are aligned so that the cavity 5 is sealed by the pressure sensitive diaphragm 4 and the base 6. The bonding method may be selected from, but not limited to: low temperature vacuum electrostatic bonding, glass paste bonding, anodic bonding, metal diffusion bonding, metal eutectic bonding, polymer adhesive bonding, plasma bonding, etc. In this example, a low temperature vacuum electrostatic bonding method or an anodic bonding method is preferably used.

Step 2: The thick silicon layer 17 and the silicon dioxide layer 16 of SOI are removed. Specifically, the thick silicon layer 17 may be etched using potassium hydroxide or TMAH, and then the silicon dioxide layer 16 is then etched with hydrofluoric acid. After the thick silicon layer 17 and the silicon dioxide layer 16 are removed, the pressure sensitive diaphragm will exhibit a wavy structure.

2.4 Cutting

In the case of producing multiple sensors one time, it is necessary to cut the pressure sensitive diaphragm and the base bonded together. The cutting method includes quadrangle, hexagon or octagon cutting, as shown in FIG. 5B. Optionally, an ultraviolet laser of 193 nm may also be used for laser cutting to cut out circular pieces.

2.5. Mounting Fiber

The fiber optic 1 is aligned and fixed to the fiber optic receiving portion 15 of the base 6. Preferably, the fiber optic 1 is fixed by means of bonding and curing of UV glue 7. The curing method may be selected from, but not limited to, glass solder bonding, electromagnetic heating, laser heating, and laser welding.

The above method has several advantages, including but not limited to:

multiple sensors can be produced in batches one time, thereby the production costs is reduced;

the sensor product has good consistency;

by doping a pressure sensitive diaphragm with a substance, it reduces nonlinearity of the sensor and improves applicability of the sensor in different ranges while ensuring an optimized structure of a sensor; and internal stresses are formed by doping, and the operation is simple; compared with formation of a multi-layer structure, especially the multi-layer structure for a miniature sensor, the doping method is simpler and easier to implement in terms of production operation.

The Fabry-Perot sensor proposed by the present disclosure can be applied to many fields, for example, it is particularly suitable for the medical field. In addition, it can also be used for other measurements.

The exemplary embodiments of the present disclosure have been described in detail above with reference to preferred embodiments. However, those skilled in the art can understand that various variations and modifications can be made to the above specific embodiments without departing from the concept of the present disclosure, and multiple combinations of various technical features and structures proposed by the present disclosure can be made without going beyond the protection scope of the present disclosure. The protection scope of the present disclosure is determined by the appended claims.

LIST OF REFERENCE SIGNS

1_1 Fiber optic
1_2 First reflective mirror

1_3 Second reflective mirror
1_4 Pressure sensitive diaphragm
1_5 Cavity
1_6 Base
1_7 UV glue
2_1 Base
2_2 First layer of pressure sensitive diaphragm
2_3 Second layer of pressure sensitive diaphragm
1 Fiber optic
2 First reflective film
3 Second reflective film
4 Pressure sensitive diaphragm
5 Cavity
6 Base
7 UV glue
8 Local area
9 Molecule or atom of base material
10 Molecule or atom of doped material
11 Fabry-Perot sensor
12 Silicon substrate
13 Mask
14 Photoresist
15 Fiber optic receiving portion
16 Silicon dioxide layer
17 Thick silicon layer

What is claimed is:

1. A Fabry-Perot sensor comprising:
a base;
a cavity formed between the base and a pressure sensitive diaphragm, and closed by the base and the pressure sensitive diaphragm;
the pressure sensitive diaphragm fixed to the base, wherein the pressure sensitive diaphragm has at least one local areas, each of the local areas has a doping substance doped into a base material of the pressure sensitive diaphragm to generate stresses, wherein any of the local areas does not extend the entire thickness of the pressure sensitive diaphragm, and the pressure sensitive diaphragm exhibits a wavy structure under the action of the stresses; and
a fiber optic configured to conduct a light signal, wherein one end of the fiber optic is fixed to a fiber optic mounting portion of the base, and the fiber optic mounting portion is located at an end of the base opposite the cavity.

2. The Fabry-Perot sensor as claimed in claim 1, wherein the pressure sensitive diaphragm is an integrated single-layer structure, wherein the pressure sensitive diaphragm has a thickness of 1 µm to 5 µm, the base has a thickness of 200 µm to 500 µm, and the cavity has a diameter of 80 µm to 300 µm.

3. The Fabry-Perot sensor as claimed in claim 1, wherein the stresses are tensile stresses or compressive stresses.

4. The Fabry-Perot sensor as claimed in claim 1, wherein the at least one local areas comprise a circular area located at the center of the pressure sensitive diaphragm and annular area surrounding the center of the pressure sensitive diaphragm.

5. The Fabry-Perot sensor as claimed in claim 1, wherein the local area is located in a local thickness of the pressure sensitive diaphragm close to the cavity, or the local area is located in a local thickness of the pressure sensitive diaphragm away from the cavity.

6. The Fabry-Perot sensor as claimed in claim 1, wherein different local areas are doped with different doping substances, or wherein the same local area is doped with different doping substances.

7. The Fabry-Perot sensor as claimed in claim 1, wherein the base material of the pressure sensitive diaphragm is silicon, and wherein the doping substance is selected from a group consisting of P, B, As, Al, Ga, Sb, Ge, 0, Au, Fe, Cu, Ni, Zn, and Mg.

8. The Fabry-Perot sensor as claimed in claim 1, wherein the fiber optic is fixed to a fiber optic receiving portion by UV glue, and the Fabry-Perot sensor further comprises a first reflective film and a second reflective film, the first reflective film is located on one side of the pressure sensitive diaphragm, and the second reflective film is located at the bottom of the cavity, and wherein materials forming the first reflective film and the second reflective film are selected from a group consisting of Cr, Ti, Au, Ag, TaN, $Al_2O_3$, and $Ta_2O_5$.

9. The Fabry-Perot sensor as claimed in claim 1, wherein a material forming the base is selected from a group consisting of glass, single crystal silicon, silicon carbide, and sapphire.

10. The Fabry-Perot sensor as claimed in claim 1, wherein the cavity is a vacuum cavity.

11. A method of manufacturing a Fabry-Perot sensor comprising:
manufacturing a pressure sensitive diaphragm, comprising:
step 1: providing a pressure sensitive diaphragm substrate for producing the pressure sensitive diaphragm; and
step 2: doping at least one doping substances into at least one local areas of the pressure sensitive diaphragm substrate to generate stresses in the local areas, wherein any of the local areas does not extend the entire thickness of the pressure sensitive diaphragm;
manufacturing a base with a cavity; and
bonding the pressure sensitive diaphragm and the base together such that the cavity is closed by the pressure sensitive diaphragm and the base.

12. The method as claimed in claim 11, wherein the pressure sensitive diaphragm after substance doping is an integrated single-layer structure, wherein the pressure sensitive diaphragm has a thickness of 1 µm to 5 µm, and the base has a thickness of 200 µm to 500 µm, and wherein the stresses are tensile stresses or compressive stresses.

13. The method as claimed in claim 11, wherein in step 2, the doping substance and a base material constituting the pressure sensitive diaphragm substrate are doped at the atomic or molecular level.

14. The method as claimed in claim 11, wherein the local areas are at least one annular areas, or the local areas are at least one circular areas, and wherein the pressure sensitive diaphragm substrate is an SOI wafer, or the pressure sensitive diaphragm substrate is a silicon substrate on which a silicon dioxide layer is formed.

15. The method as claimed in claim 11, wherein the step 1 further comprises: cleaning and drying the pressure sensitive diaphragm substrate, wherein the step 2 further comprises: applying a photoresist to the pressure sensitive diaphragm substrate, and removing part of the photoresist to expose the local area to be doped.

16. The method as claimed in claim 15, further comprising:
bonding the pressure sensitive diaphragm to the base in a vacuum environment;
after bonding the pressure sensitive diaphragm to the base, removing a thick silicon layer and a silicon dioxide layer of the SOT; and cutting the pressure sensitive diaphragm and the base bonded together to form multiple Fabry-Perot sensors.

17. The method as claimed in claim 11, wherein in step 2, doping is performed by high temperature diffusion, and the high temperature diffusion is concentrated boron diffusion at high temperature.

18. The method as claimed in claim 11, wherein in step 2, doping is performed by ion implantation, and implanted ions are selected from a group consisting of B, P, and As during the ion implantation.

19. The method as claimed in claim 11, wherein the step of manufacturing the pressure sensitive diaphragm further comprises:
   step 3: cleaning the pressure sensitive diaphragm after doping to remove impurities on the surface of the pressure sensitive diaphragm;
   step 4: annealing the cleaned pressure sensitive diaphragm; and
   step 5: forming a first reflective film on one side of the pressure sensitive diaphragm by one of evaporation, sputtering, chemical vapor deposition, electrochemistry, and epitaxial growth.

20. The method as claimed in claim 11, wherein the step of manufacturing the base comprises:
   growing a mask on the base;
   applying a photoresist on the mask;
   removing part of the photoresist to expose part of the mask;
   removing the exposed mask to expose part of the base; and
   etching the exposed base to form the cavity;
   forming a second reflective film at the bottom of the cavity; and
   forming a fiber optic receiving portion at the bottom of the cavity, wherein mounting a fiber optic to the fiber optic receiving portion of the base using UV glue.

* * * * *